(12) United States Patent
Lee et al.

(10) Patent No.: US 10,370,283 B2
(45) Date of Patent: Aug. 6, 2019

(54) METHOD FOR FORMING A GLASS PREFORM

(71) Applicant: HERAEUS QUARTZ NORTH AMERICA LLC, Buford, GA (US)

(72) Inventors: Jong-Won Lee, Suwanee, GA (US); Qiulin Ma, Duluth, GA (US); Kai Huei Chang, Decatur, GA (US)

(73) Assignee: HERAEUS QUARTZ NORTH AMERICA LLC, Buford, GA (US)

( * ) Notice: Subject to any disclaimer, the term of this patent is extended or adjusted under 35 U.S.C. 154(b) by 0 days.

(21) Appl. No.: 15/543,103

(22) PCT Filed: Jan. 15, 2015

(86) PCT No.: PCT/US2015/011515
§ 371 (c)(1),
(2) Date: Jul. 12, 2017

(87) PCT Pub. No.: WO2016/114779
PCT Pub. Date: Jul. 21, 2016

(65) Prior Publication Data
US 2017/0362113 A1  Dec. 21, 2017

(51) Int. Cl.
| | |
|---|---|
| *C03B 33/06* | (2006.01) |
| *C03B 37/012* | (2006.01) |
| *C03B 37/014* | (2006.01) |
| *C03B 37/018* | (2006.01) |
| *C03B 33/10* | (2006.01) |

(52) U.S. Cl.
CPC ............ *C03B 33/06* (2013.01); *C03B 33/105* (2013.01); *C03B 37/01225* (2013.01); *C03B 37/01228* (2013.01); *C03B 37/01466* (2013.01); *C03B 37/01861* (2013.01); *Y02P 40/57* (2015.11)

(58) Field of Classification Search
CPC . C03B 33/06; C03B 33/105; C03B 37/01225; C03B 37/01228; C03B 37/01466; C03B 37/01861; Y02P 40/57
See application file for complete search history.

(56) References Cited

U.S. PATENT DOCUMENTS

| | | | | |
|---|---|---|---|---|
| 4,445,632 A | * | 5/1984 | Margolin | ............... G02B 6/25 225/101 |
| 2006/0261118 A1 | * | 11/2006 | Cox | ...................... B26F 3/002 225/96 |
| 2007/0071956 A1 | | 3/2007 | Zou | |
| 2012/0302424 A1 | | 11/2012 | Kobayashi | |
| 2014/0138421 A1 | * | 5/2014 | Gagnon | ............ C03B 33/0215 225/2 |

(Continued)

FOREIGN PATENT DOCUMENTS

| | | |
|---|---|---|
| JP | H4-046028 A | 2/1992 |
| JP | H6-016441 A | 1/1994 |

(Continued)

*Primary Examiner* — Omar Flores Sanchez
(74) *Attorney, Agent, or Firm* — Volpe and Koenig, P.C.

(57) ABSTRACT

A method of forming a glass preform of predetermined length comprises providing a length of glass material to be separated to form a preform length and a remaining length; forming a notch in the glass material; inducing a tensile stress in excess of the tensile strength of the glass in an area adjacent to the notch; and separating the preform length from the remaining length at the notch.

14 Claims, 9 Drawing Sheets

(56) References Cited

U.S. PATENT DOCUMENTS

2014/0144965 A1* 5/2014 Brown .................. C03B 33/033
  225/2
2015/0210585 A1* 7/2015 Fujii .................... C03B 33/0207
  83/880

FOREIGN PATENT DOCUMENTS

| JP | H07300330 A | 11/1995 |
| JP | 2001019458 A | 1/2001 |
| JP | 2001328834 A | 11/2001 |
| JP | 2008001551 A | 1/2008 |

* cited by examiner

METHOD FOR FORMING A GLASS PREFORM

FIELD OF INVENTION

Embodiments of the disclosure generally relate to a method for the manufacture of a glass preform, in particular a method for forming a glass preform of predetermined length.

BACKGROUND

Glass strands, for example glass fibers, rods or tubes, are typically drawn from a glass preform with a cross-sectional geometry corresponding to that of the desired final product. The production of the preform may be a continuous process in which a large hollow cylinder is either drawn into smaller tubes or it is collapsed onto a core rod in a high temperature furnace and drawn into a preform of desired diameter. The column of solid preform material is parted into sections, i.e., preforms, of a desired length from which further drawing process(es) may be used to form glass fibers, rods or tubes on a large scale.

Ideally, the parted surfaces of the preforms should be flat, smooth, perpendicular to the axis of the preform (i.e. a "square cut"), and their edges clean, sharp and free of chips or blemishes. In a continuous drawing process it is highly desirable to have a quick or instantaneous preform parting method (i.e. "snap" cut) that does not require the cutting tool to travel or move with the preform. Current "snap" cut methods of parting the solid material into preforms have been observed to create an uneven and non-perpendicular parted surfaces with chips and blemishes in the circumferential surface of the preform adjacent to the part line. Remedying the resulting surface flaws, blemishes, chips and uneven geometry results in increased production cost and decreased yield or productivity. In some cases, significant lengths of preform must be scrapped, thus reducing yield and increasing cost.

Accordingly, a need exists for a method for forming lengths of preform with improved surface characteristics and geometric precision.

SUMMARY

Embodiments of a glass preform cutting method are provided herein. In some embodiments, a method of forming a length of glass preform comprises providing a length of glass material to be separated to form a preform length and a remaining length; forming a notch in the glass material; inducing a tensile stress in excess of the tensile strength of the glass in an area adjacent to the notch; and separating the preform length from the remaining length at the notch.

Other and further embodiments of the invention are described below.

BRIEF DESCRIPTION OF THE DRAWINGS

Embodiments of the invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common in the figures. The figures are not drawn to scale and may be simplified for clarity. It is contemplated that elements and features of one embodiment may be beneficially incorporated in other embodiments without further recitation.

While described in reference to a method for parting a glass rod or tube, the invention may be modified for a variety of applications while remaining within the spirit and scope of the claimed invention, since the range of the potential applications is great, and because it is intended that the invention be adaptable to many such variations.

DETAILED DESCRIPTION

Certain terminology is used in the following description for convenience only and is not limiting. The words "front," "rear," "upper" and "lower" designate directions in the drawings to which reference is made. The words "radially inwardly" and "radially outwardly" refer to directions radially toward and away from an axis of the part being referenced. "Axially" or "longitudinal" refers to a direction along the axis of a shaft or other part. The word "preform" could mean solid rod or hollow tube. The terminology includes the words specifically noted above, derivatives thereof and words of similar import.

Figure 1:
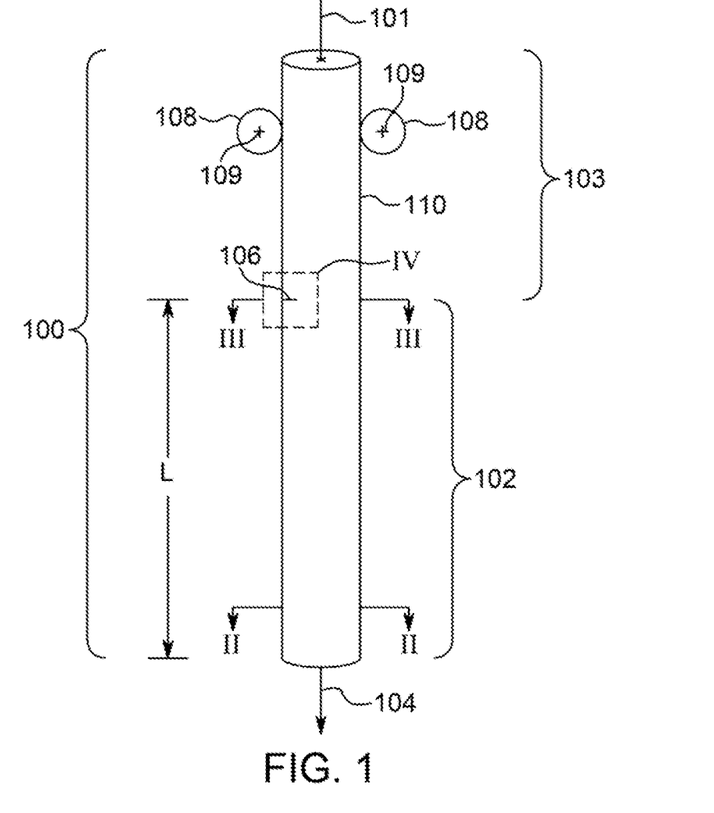
FIG. 1 is a side view of a glass rod or tube for use with an embodiment of the method.
Figure 2A:
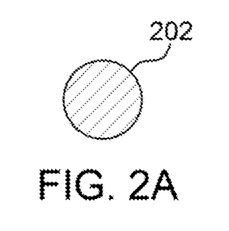
FIGS. 2A-2C are cross sectional views of embodiments of the rod or tube of FIG. 1 taken along line II-II.

FIG. 1 illustrates a portion of a solid glass material, glass rod or tube 100, for use with the method prior to separating a preform 102 of length L from the remaining length of glass rod or tube 103. The glass rod or tube 100 may be, in non-limiting examples, formed from fused silica, or other glass material. In some embodiments, the glass rod or tube 100 is formed as a solid cylinder 202 as illustrated in FIG.

Figure 2B:
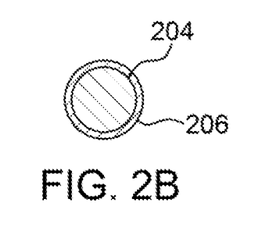
Figure 2C:
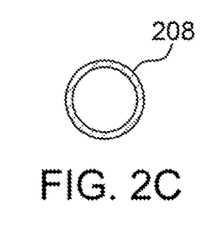

2A. In another embodiment, the glass rod 100 is formed as a solid rod 204 encased in a jacket or hollow cylinder 206 disposed around the periphery of the rod 204, with the solid rod 204 and the jacket 206 formed from the same or different glass materials. In another embodiment, the glass rod may be formed as a hollow cylinder or tube 208 as illustrated in FIG. 2C.

In general, the process for making the glass rod or tube 100 is a linear process in which the glass rod or tube 100 advances in a linear direction corresponding to the longitudinal axis 101 of the glass rod or tube 100 in a continuous process. For example, as illustrated in FIG. 1, the glass rod 100 or tube may advance in a downwardly directed vertical direction illustrated by arrow 104. Pulling wheels 108 support the weight of the glass rod 100 while the pulling wheels 108 rotate to facilitate advancement of the glass rod 100 in the direction of arrow 104.

A notch 106 is formed through the outer cylindrical surface 110 of the glass rod or tube 100 when the glass rod or tube 102 advances to a point that preform 102 has reached a prescribed length L. The notch 106 may be formed by any suitable method, including, in non-limiting examples, an air driven saw (not shown) or an abrasive wheel (not shown) or laser (not shown). Other cutting tools suitable for forming a notch in a glass rod may also be used.

Figure 3A:
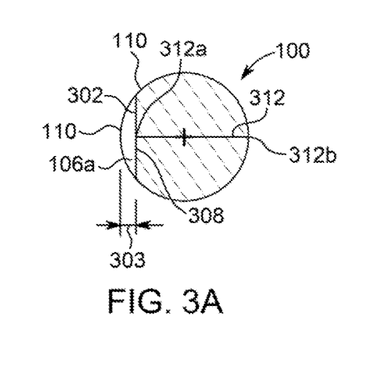
FIGS. 3A and 3B are cross sectional views of the rod if FIG. 1 taken along line III-III according to embodiments of the disclosure.

As illustrated in the non-limiting embodiment of FIG. 3A, the cut surface 302 forming the notch 106a may form a chord 308 of the circular cross section with a depth 303 so that the remaining cross section of the glass rod 100 at the notch 106a is a truncated circle. As illustrated in the non-limiting embodiment of FIG. 3B, the cut surface 304 forming the notch 106b may be a semi-circle 310 of depth 305 so that the remaining cross section of the glass rod or tube 100 at the cut is a crescent shape. "Diameter" as used here is understood to be the diameter of the glass rod or tube 100 prior to forming the notch 106. Because the cross section of the glass rod 100 at the notch 106 (i.e., after the notch is formed) is not a circle, 312 cannot be a diameter. For ease of description, "diameter" is used loosely to describe 312.

Figure 3B:
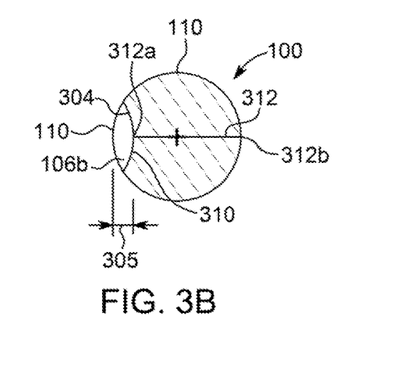

The notch 106 is formed partially through a diameter 312 of the glass rod or tube 100 as may be seen in FIGS. 3A and 3B so that diameter 312 of the circular cross section is normal to (i.e., perpendicular to) the cut surface 302, 304 at the midpoint of the cut surface 302, 304. The diameter 312 has a first end 312a that intersects the cut surface 302, 304 and a second end 312b that extends to the outer cylindrical surface 110 of the glass rod or tube 100. The second end 312b may be described as being opposite the notch 106.

Figure 4A:
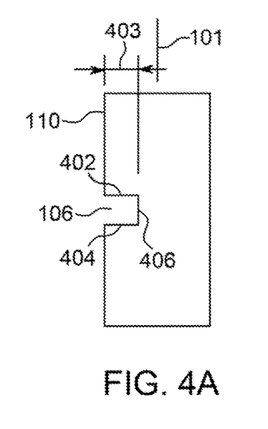
FIGS. 4A-4C are enlarged views of area IV of FIG. 1 according to embodiments of the disclosure.
Figure 4B:
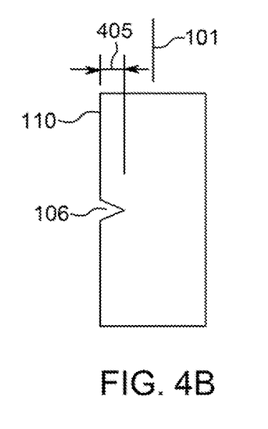

The notch 106 profile may be formed as a kerf as if by a saw blade. FIG. 4A is an enlarged view of the portion of the glass rod 100 identified as IV in FIG. 1. FIG. 4A is viewed perpendicular to the longitudinal axis 101 of the glass rod or tube and is illustrative of a kerf profile in an embodiment. The notch is formed to a depth 403 with generally parallel upper and lower walls 402, 404 perpendicular to the longitudinal axis 101 and a flat bottom 406 that is parallel to the longitudinal axis 101. Alternately, the profile of the notch 106 may be inwardly tapered (towards the longitudinal axis 101) as illustrated in FIG. 4B. The taper may begin at the outer surface 110 and continue for the depth 405 of the notch 106 as illustrated in FIG. 4B. Alternately, the notch 106 may include generally parallel upper and lower walls 412, 414 perpendicular to the longitudinal axis 101 from the outer surface 110 to a first depth at which point the taper begins and continues to the notch depth 407. Either of the tapered notches of FIGS. 4B or 4C may terminate at a point as illustrated or may be truncated or rounded at the innermost end of the tapered portion.

Figure 4C:
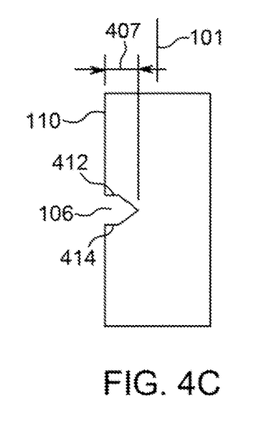

FIGS. 4A-4C illustrate the notches 106 as symmetrical for ease of illustration only. Other notches lacking symmetry may be used with similar beneficial results.

In a preferred embodiment, the notch 106 is formed while the glass rod or tube 100 is moving in a direction corresponding to arrow 104. This may be accomplished by a preferred notch-forming process (for example a cutting process) in which the cutting tool path is transverse to and spaced apart from the longitudinal axis 101, and does not hinder the advancing glass rod or tube 100. Alternately, the cutting tool may move in the longitudinal direction (i.e., the direction of arrow 104) of the glass rod or tube 100 as the notch is being formed.

The inventors have observed that a preform 102 can be parted from the glass rod or tube 100 at a notch 106 formed as described above by stressing the glass rod or tube 100 so that a tensile stress is induced in the area of the notch 106 in excess of the tensile strength of the material from which the glass rod or tube 100 is formed. When separated using a notch 106 as described above, the parted surface of the preform 102 and the corresponding surface of the remaining glass rod or tube 103 may be formed with surface characteristics superior to those achieved with known methods. For example, the parted surfaces may be formed with clean edges and no side chips or flaws, may be smoother, flatter (or more mirror-like), as well as more perpendicular to the preform axis.

As used throughout this disclosure, "parted surface(s)" means one or both of the surfaces formed generally at the notch 106 when the preform 102 is separated from the remaining glass rod or tube 103. "Parted end" refers to the end portion of the remaining glass rod or tube 103 or the preform 102 after the preform 102 is parted from the remaining glass rod or tube 103.

Further, the outside surfaces 110 of the cylindrical glass rod or tube 100 at the parted end of the preform 102 and the remaining length glass rod or tube 103 may have enhanced surface characteristics over the resulting surfaces achieved using known methods. For example, chip formation on the outside surface 110 of the cylindrical glass rod or uneven edges may be minimized adjacent to the parted ends.

Figure 5:
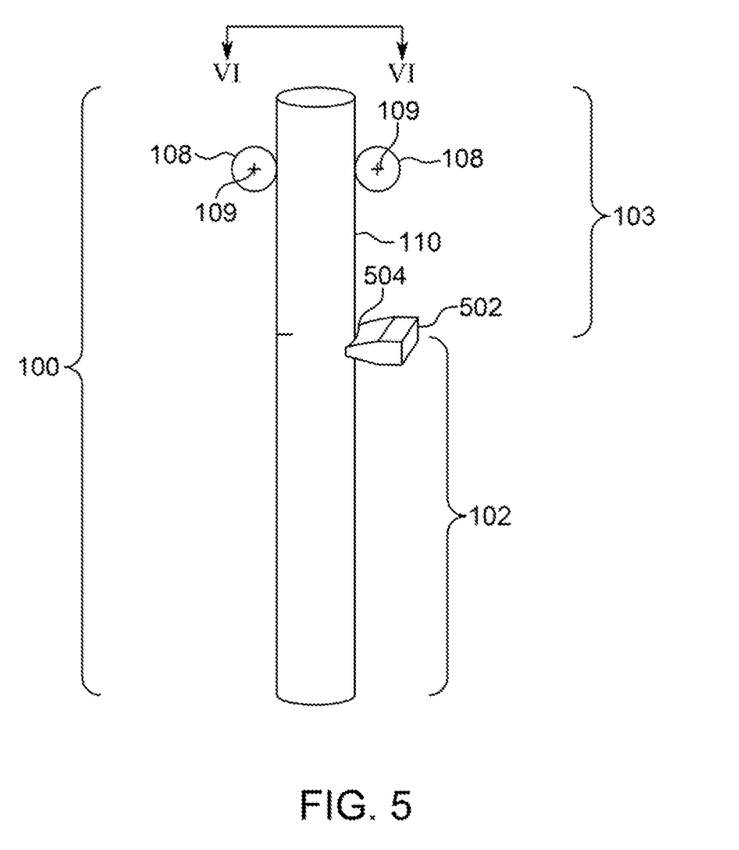
FIG. 5 is a side view of a glass rod or tube prior to separation of a preform in accordance with an embodiment of the method.

The stress may be induced by deflecting the glass rod or tube 100 so that a portion of the glass rod has a deflection component in a direction generally perpendicular to the longitudinal axis 101, i.e., a transverse deflection. In a non-limiting embodiment, the deflection may be achieved with a tool 502 (FIG. 5) impacting the glass rod or tube 100 at a position opposite the notch 106 as described above. The longitudinal position for impacting the glass rod or tube 100 to cause the deflection may be displaced from the notch 106 or may be aligned with the notch 106. The deflection of the glass rod is sufficient to induce a tensile stress at the notch 106 sufficient to separate the preform 102 from the remaining glass rod or tube 103. The deflection may be the result of applying a force opposite the notch. In a preferred embodiment, the deflection is the result of an impact opposite the notch 106.

Figure 6:
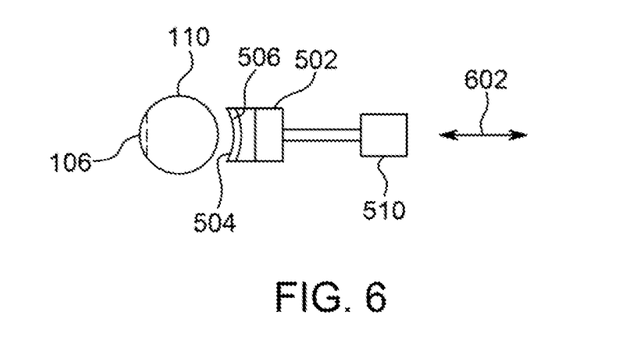
FIG. 6 is a longitudinal view of the glass rod or tube taken along line VI-VI of FIG. 5 in accordance with an embodiment of the invention.

In a preferred embodiment, the tool 502 used to deflect the glass rod or tube 100 has an impact face 504 formed to correspond with the outer shape of the glass rod or tube 100. As seen in FIG. 6, a longitudinal view of the glass rod 100 or tube taken along line VI-VI of FIG. 5, the impact face 504 is configured with a curvature that corresponds with the outer cylindrical surface 110 of the glass rod or tube 100. In some embodiments, the curvature of the impact face 504 geometrically matches the outer cylindrical surface 110 of the glass rod or tube 100. The impact face 504 thus configured distributes the impact force over a larger area than a sharp-edged tool as used in known methods, and this reduces the compressive stress induced chips or damages at the impact surface area of the preform.

The tool 502 may extend and retract perpendicular to the longitudinal axis 101 of the glass rod or tube 100 generally in the directions indicated by arrow 602 illustrated in FIG. 6. The tool 502 may be activated to extend and retract by any actuator 510 suitable for producing a deflection or impact sufficient to induce a tensile stress in excess of the tensile strength of the glass rod or tube 100 at the notch 106. In non-limiting embodiments, the actuator 510 may be a pneumatic or hydraulic cylinder configured to extend the tool 502 to contact the glass rod or tube 100 opposite the notch 106 with a sufficient impact to bend the glass rod or tube 100 and induce the required tensile stress.

In a preferred embodiment, the impact face 504 includes a resilient layer 506 that, by extending the contact time between the impact face 504 and the glass rod or tube 100, attenuates the undesirable compressive stress and chips or damages at the contact area caused by the impact of the tool 502. In some embodiments, the impact face 504 is formed as resilient layer 506. In another embodiment, the resilient layer provides a backing for the impact face 504. For example, the resilient layer may have a Shore A hardness of about 10-100, or about 30-80, or about 50-60.

A sufficient tensile stress may also be induced at the notch 106 by contacting the glass rod or tube 100 with a vibration-inducing tool, such as a vibrator (not shown), and vibrating the glass rod or tube 100 so that a resonant frequency is achieved. As the glass rod or tube 100 vibrates, the deflection amplitude may be tuned to reach a maximum at the notch 106 by adjusting the vibrator. It has been observed that at a resonant frequency the amplitude of the vibration in the preform may be sufficient to achieve a deflection at the notch 106 great enough to induce a tensile stress in excess of the tensile strength of the glass rod or tube 100 at the notch 106. As discussed above, this stress condition may cause the preform 102 to separate from the remaining glass rod or tube 103. The vibrational method to part preforms may provide outside surfaces 110 of the cylindrical glass rod or tube 100 adjacent to the parted surfaces that are substantially free, or completely free, of indentation induced chips or damage that may occur in the impact method where the stresses caused by indentation from the impact opposite to the notch 106 or other impact locations may be higher than the glass fracture strength.

Figure 13:
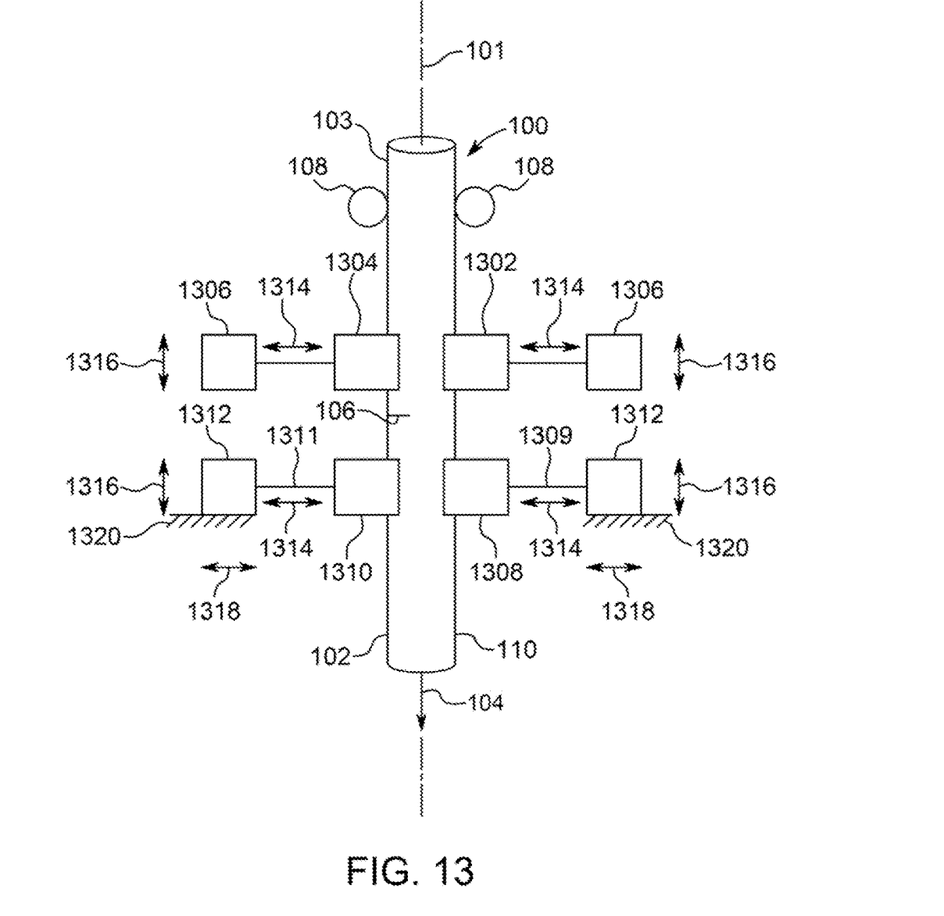
FIG. 13 is an illustrative example of an apparatus to hold the glass rod or tube in accordance with an embodiment of the present invention.

In one embodiment of the invention illustrated in FIG. 13, two or more opposing pairs of grippers (two pairs 1302/1304 and 1308/1310 shown) are disposed about the glass rod or tube 100 and adapted for displacement towards and away from the glass rod or tune 100 as shown by arrows 1314 through a connection to an actuator 1306, 1312, via a rod 1309, 1311, respectively. The inward (toward the glass rod) displacement is provided to cause the grippers 1302/1304 and 1308/1310 to engage a portion of the outer cylindrical surface 110 of the glass rod or tube 100. The portion of the gripper engaging the glass rod 100 may have an engagement surface that corresponds with the outer cylindrical surface 110 of the glass rid or tube 100.

Each pair of grippers 1302/1304 and 1308/1310 is supported for controlled movement parallel to the longitudinal axis 101 of the glass rod or tube 100 as indicated by arrows 1316. In a preferred embodiment, the speed of the displacement as indicated by arrows 1316 is adjustable and may substantially match, or match, the axial displacement speed of the glass rod or tube 100 in the direction of 104. The longitudinal displacement of gripper pair 1308/1310 may be controlled separately from the longitudinal displacement of gripper pair 1302/1304.

At least one pair of grippers 1308/1310 and the associated actuator 1312 may be supported for displacement having a component perpendicular to the longitudinal axis 101 as illustrated by arrows 1318.

One pair of grippers 1302/1304 engages the remaining length of glass rod or tube 103 and a second pair 1308/1310 engage the preform 102 and may support the remaining glass length 103 against deflection. Additional pairs of grippers may be configured to engage the remaining length of glass rod or tube 103 or the preform 102, or both. The grippers may engage the glass rod or tube 100 before or after formation of the notch 106, and advance with the glass rod or tube 100 in the direction of 104 for a distance after engaging the glass rod or tube 100.

At a prescribed point in the advancement of the glass rod or tube 100, grippers 1308/1310 displace in the same direction to place the glass rod or tube 100 in tension in the area of the notch 106. The displacement has at least a lateral component generally parallel to 1318. As drawn in FIG. 13, gripper 1308 is displaced to the right along 1318 concurrently with gripper 1310 being displaced to the right along 1318 at the same speed, with the same time duration, and over the same distance as gripper 1308.

The lateral displacement may be brought about by the displacement of the support 1320 of the actuator 1312 to the right as drawn in FIG. 13. In an embodiment, the lateral displacement may be brought about by the controlled lateral movement of the grippers 1308/1310 via the actuator 1312. In this embodiment, the rod 1309 for gripper 1308 moves to the right as drawn (i.e., it retracts into the actuator 1312) as the rod 1311 for gripper 1312 moves to the right as drawn (i.e., extends from the actuator 1312). In a preferred embodiment, the grippers 1308/1310 move in the same direction at the same speed and for the same duration in order to maintain engagement with the glass rod or tube 100.

One current method of parting a glass rod or tube may be described as a manual snap-cut method in which the circumference of a glass rod or tube is scored at a desired location. The rod or tube is then impacted at the score mark with a sharp-edged unyielding surface, such as the wedge-like peen of a hammer. The method is typically convenient and fast, but frequently results in poorly cut preforms or tubes with uneven end faces (parted surfaces) and side chips, which shorten the usable length of the preform and decreases preform glass yield.

Often, in conventional snap-cut methods, unwanted glass fractures or chips are formed at or near the impact area. This is because the impact side experiences a high compressive stress caused by the impact of the sharp-edged hammer in addition to the compressive stress caused by bending of the glass rod or tube.

Contrary to a common misunderstanding of the fracture mechanism, the fracture actually begins on the side opposite the impact point and travels towards the impact site because the tensile stress first reaches its maximum opposite the impact site due to bending. As the crack propagates towards the impact site, the compressive stress may change the direction of the fracture, producing undesirable side chips and uneven fractured surfaces. In fact, the sharp-edged impact results high compressive stress near the impact site that interferes with clean, smooth, and perpendicular separation of parted surfaces, and it also causes further indentation fractures or cracks at the impact site.

Reducing the compressive stresses generated at the impact site desirably lessens the incidence of side chips and cracks and improves the surface characteristics of the fractured surfaces by limiting changes in the direction of the fracture. Experimentation and analysis provided the result that the compressive stresses induced in a glass rod could be beneficially reduced at the impact site by using a tool (e.g., tool 502) with an impact face (e.g., 504) contoured to correspond with a portion of the outside surface 110 of the glass rod or tube 100.

Figure 7:
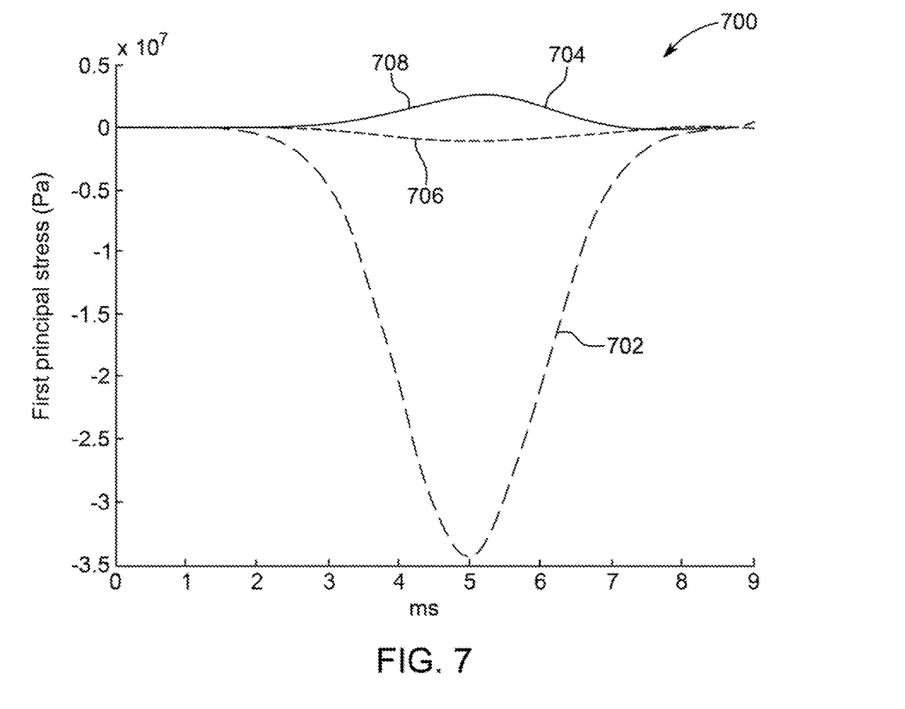
FIG. 7 is an illustrative plot of stresses induced in a glass rod.
Figure 8A:
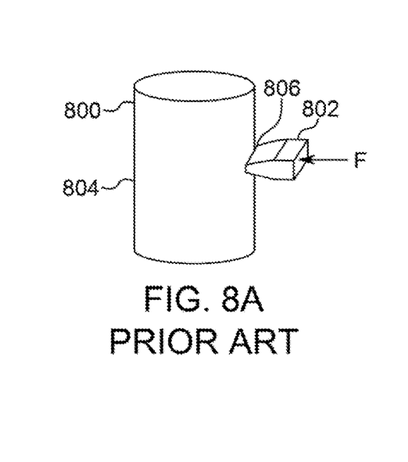
FIG. 8A is a perspective view of a portion of a glass rod or tube prior to parting using a known method.

FIG. 7 is an illustrative plot 700 comparing the stresses induced in a glass rod using a known method (FIG. 8A) and the method (FIG. 8B) vs. time in milliseconds. In a known method illustrated in FIG. 8A, a sharp-edged tool 802 having a wedge-shaped face is used to impact a cylindrical glass rod 800.

Referring to FIG. 7, curve 702 is a plot of a representative compressive stress induced by the known impact tool 802 at the impact site 806 when impacted with an impact force F (for example, a 4000 N force). Curve 704 is representative of the tensile stress induced at a location 804 opposite the impact site 806 of the same impact force F.

Figure 8B:
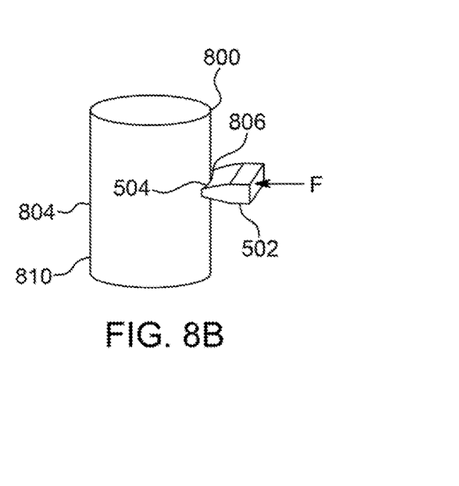
FIG. 8B is a perspective view of a portion of a glass rod or tube prior to parting using an embodiment of the method.

In one embodiment of the method illustrated in FIG. 8B, the impact tool 502 (see also FIGS. 5 and 6) has a contoured face 504. The contoured impact face 504 is configured to correspond with the outer cylindrical wall 810 of the glass rod 800 and in some cases the impact face 504 may geometrically match the outer cylindrical wall 810. In a preferred embodiment, the contoured impact face includes a resilient layer 506 as discussed above.

Curve 706 is a plot of a representative compressive stress induced by the impact tool 502 according to the disclosure. The impact tool 502 impacts the glass rod 800 at the impact site 806 with the same force F described above.

Curve 708 is representative of the tensile stress induced by the impact tool 502 at a location 804 opposite the impact site 806 when the glass rod 800 is impacted with the same impact force F. The inventors' analysis and observation showed that the resultant tensile stress is substantially the same as the tensile stress induced by the known method represented by curve 704. Accordingly, curve 708 essentially follows curve 704 and appears as one curve in FIG. 7.

Figure 9:
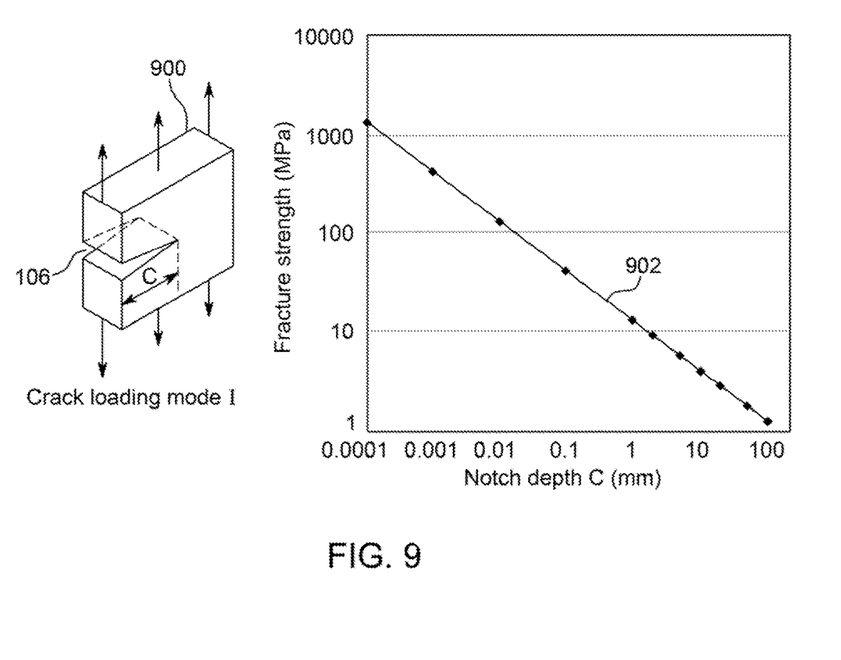
FIG. 9 is an exemplary graph illustrative of a relationship between fracture strength with notch depth.

The depth of the notch 106 formed opposite the impact site reduced the fracture strength of the glass preform 100. FIG. 9 is illustrative of a relationship between the fracture strength with notch depth for the test sample 900 illustrated. Although the test sample has a notch similar to that illustrated in FIG. 4B, similar results may be found for other notch formats (for example those shown in FIGS. 4A or 4C).

FIG. 9 shows a relationship between the notch depth and the fracture strength for a glass rod 100 of a known construction. FIG. 9 represents a plot 902 of the substantial decrease in fracture strength with the increase in the notch depth C for a particular material with the exemplary notch 106 configuration shown. Other notch configurations and glass rod constructions may yield similar results. The illustrative relationship between notch depth and fracture strength exemplified in FIG. 9, or a corresponding plot for a particular notch shape and material, may be used to estimate the tensile strength necessary to fracture the glass preform 100. In doing so, an optimized notch depth may be determined for a particular material.

Figure 10:
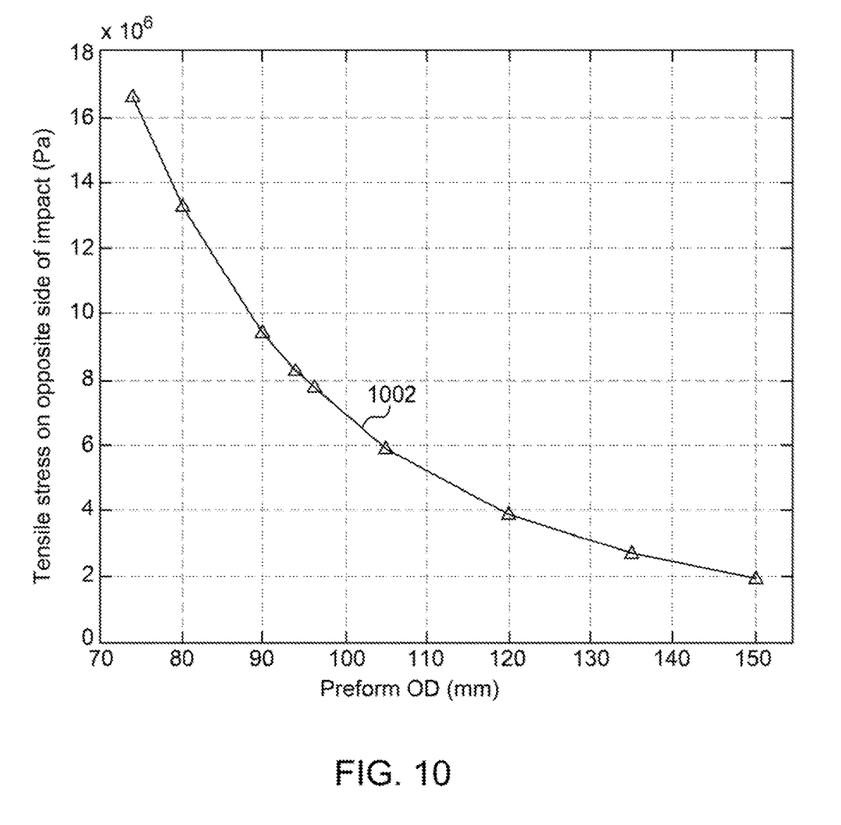
FIG. 10 is an exemplary graph illustrative of tensile stress vs. glass rod outside diameter.

FIG. 10 shows a relationship between the outside diameter (OD) of a glass rod or preform and the magnitude of tensile stress induced opposite the impact site for a given impact force. FIG. 10 is a plot 1002 illustrative of the tensile stress induced opposite (e.g., at 804) the impact site (e.g., 806) for glass rods 100, or preforms 102, of various outside diameters when subjected to a known impact force F. Data from FIGS. 9 and 10 were used to optimize a notch depth for a glass rod of a given diameter.

Figure 11:
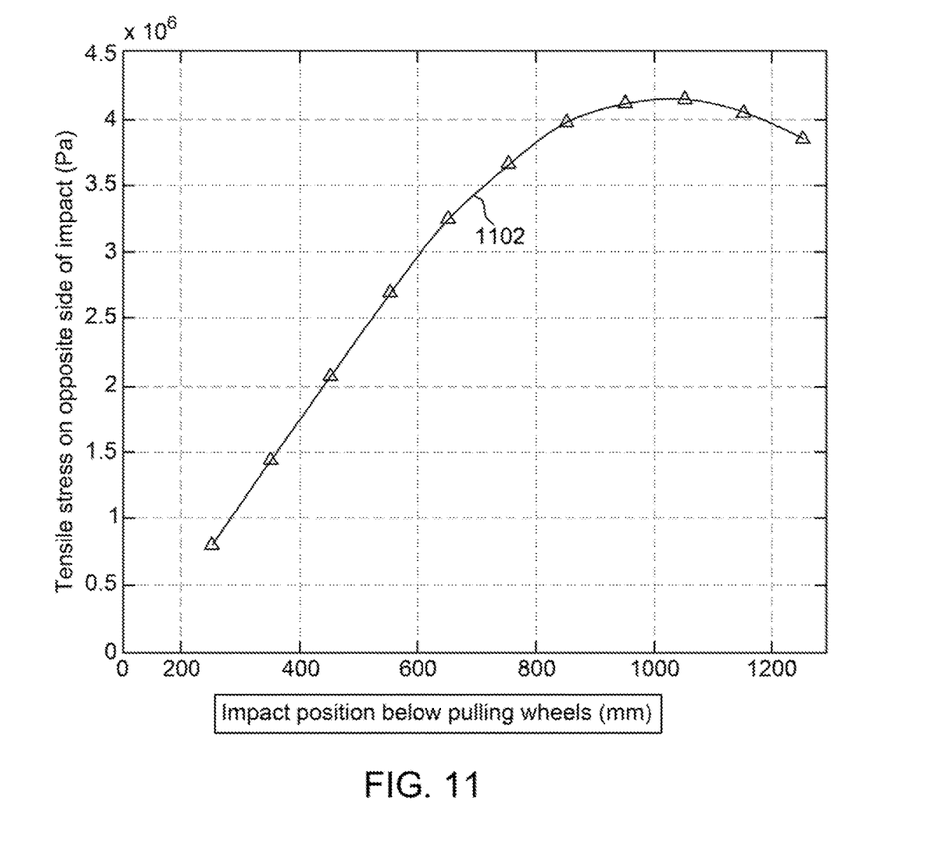
FIG. 11 is an exemplary graph illustrative of tensile stress opposite the impact site vs. longitudinal location of the impact site.

FIG. 11 may be used to optimize the method by locating an efficient location to impact the glass rod 100 to separate the preform 102. The plot 1102 illustrates the tensile stress induced at a point (e.g., 804) opposite the impact site (e.g. 806) for a given impact force, F with the force applied at various points along the longitudinal axis 101. As illustrated in FIG. 1, pulling wheels 108 are fixed with respect to the longitudinal axis 101 of the glass rod 100. The pulling wheels 108 are supported for rotation about their centers 109 and they suppress deflection.

FIG. 11 illustrates the maximum tensile stress induced at a point (e.g., 804) opposite the impact site (e.g., 806) when a known impact force is applied at various distances below the centers 109 of the pulling wheels 108. For the exemplary plot 1102 of FIG. 11, the maximum tensile stress is induced in the glass rod 100 when the impact site 806 is spaced below the pulling wheels 108 by about 1050 mm. For the exemplary glass rod used to develop the plot of FIG. 11, an impact site 806 located about 1050 mm below the centers 109 of the pulling wheels 108 would produce the maximum tensile stress in the glass rod opposite the impact site 306.

For a given glass rod, the data from FIGS. 9, 10, and 11 may be combined to yield a set of efficient operating parameters. The operating parameters include: a notch configuration comprising notch profile and depth; the magnitude of the impact force applied to the glass rod sufficient to fracture the glass rod; and the location to apply the impact force. As used herein, "efficient operating parameters" means a combination of parameters that achieves an optimal final product.

An objective of the method was the production of glass preforms with enhanced surface characteristics on the parted faces and on the circumferential surface of the preform adjacent to the part line. One way to achieve this objective was to minimize the compressive stresses induced in the glass rod. Based on the new understanding of the fracture mechanism and fracture-inducing stresses in a glass rod, the method was shown to yield efficient operating parameters for producing glass preforms or tubes with improved surface characteristics.

The method comprises using an impact tool having an impact face configured with a curvature that corresponds with, or, in some cases, geometrically matches, the outside surface of the glass rod or tube and applying the developed data for a particular glass rod or tube to determine the most efficient combination of notch configuration (e.g., profile and depth), impact force location, and impact force magnitude.

Figure 12:
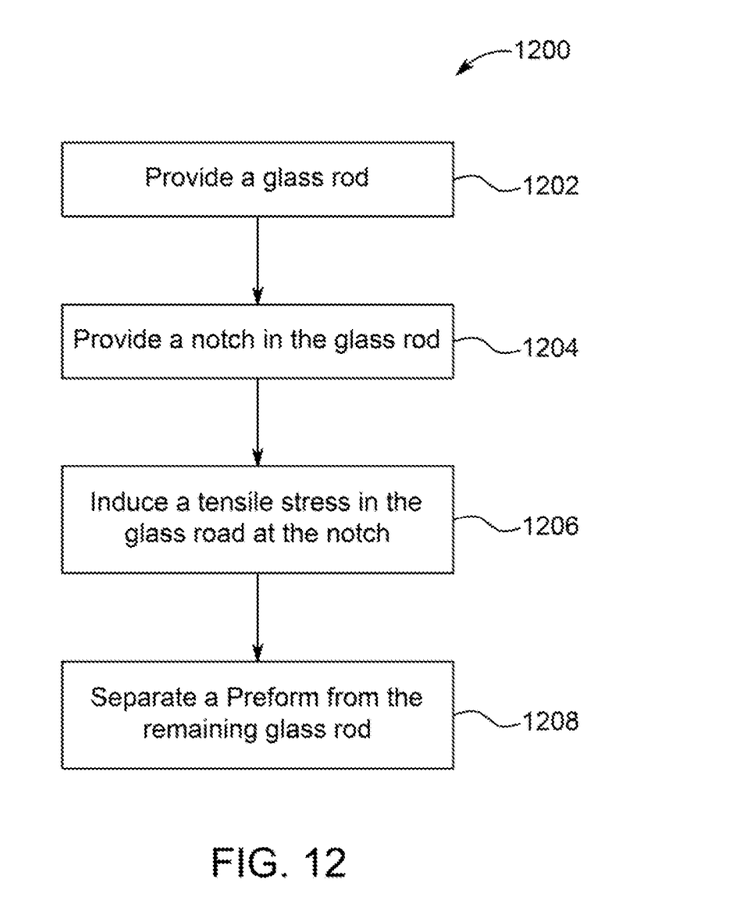
FIG. 12 is a flow chart illustrative of a method according to the disclosure.

FIG. 12 is a flow diagram 1200 of a method in accordance with the disclosure. At 1202, a glass material, for example glass rod or tube 100, is provided to be separated into a glass preform length 102 and a remaining glass length 103. The glass rod or tube 100 advances in a linear fashion, for example advancing vertically downward as illustrated in FIG. 1. Pulling wheels 108 may be provided to guide and support the glass rod or tube 100.

When the advancing glass rod or tube 100 reaches a point such that the glass rod or tube 100 can be parted to form a preform 102 of length L, a notch 106 is formed at 1204. The notch 106 may have a lateral profile as illustrated in FIGS.

4A-4C and formed to a depth 403-407, respectively. Alternately, the notch 106 may have any other convenient profile and depth.

The notch 106 is generally formed perpendicular to the longitudinal axis 101 of the glass rod or tube 100 and may be formed by any convenient means, for example an air driven saw, abrasive wheel, or laser. The notch 106 may have a cut surface 302, 304, as illustrated in FIGS. 3A, 3B, that is perpendicular to a diameter 312 of the cross section of the glass rod 100 at a midpoint of the cut surface 302, 304.

In order to separate, or part, the preform 102 from the remaining glass rod or tube 103, the glass rod or tube 100 is stressed at 1206. A tensile stress is induced in the glass rod or tube 100 at the notch 106 or in an area adjacent to the notch 106 or at the notch 106 so that the tensile stress is of sufficient magnitude to fracture the glass rod at the notch. In a preferred embodiment, the method provides the minimum stress necessary to cause the fracture at the notch.

In an embodiment of the method, the tensile stress is induced by impacting the glass rod or tube 100 with a tool 502 opposite the notch 106. By impacting the glass rod, the tool 502 deflects the glass rod or tube 100 sufficiently to induce a tensile stress at the notch 106 in excess of the tensile strength of the glass rod at that location.

The tool 502 preferably has a contoured impact face 504 that comprises a resilient layer 506 as described above. The tool 502 may be advanced and retracted perpendicular to the longitudinal axis 101 of the glass rod by any actuator 510 capable of providing an adequate impact force F, for example a hydraulic or pneumatic cylinder.

The location of the impact, i.e., the impact site (for example 806) may be determined by the methodology discussed above, which applies the new understanding of the fracture mechanism and fracture-inducing stresses in a glass rod or tube. The impact site may be longitudinally displaced from the notch 106, or may be diametrically opposite from the notch 106.

The configuration of the notch 106, the impact site 806, and the magnitude of the impact force F may vary according to the particular application and the particular objective of the parting operation.

An adequate tensile stress may be induced at the notch 106 in other ways with similar results. For example the preform length 102 may be vibrated at a resonant frequency as described above so a tensile stress in excess of the tensile strength of the glass rod 100 is exceeded at the notch 106.

In an embodiment of the method, a tensile stress is induced by gripping the glass rod or tube 100 with pairs of oppositely acting grippers at the preform portion 102 and the remaining glass length 103 (i.e., on either side of the notch 106) and deflecting preform portion 103 so that a sufficient stress is developed at, or adjacent to, the notch 106 to exceed the strength of the glass rod or preform at the notch 106. The grippers are arranged in pairs as shown in FIG. 13 (2 pairs shown) with each gripper acting to oppose the other of the pair. Gripper 1302 acts opposite to gripper 1304 and gripper 1308 acts opposite to gripper 1310.

The grippers 1302/1304 and 1308/1310 may grip the rod or tube 100 and advance with the rod or tube parallel to the longitudinal axis 101 of the rod or tube 100 for a distance. As the grippers advance, one pair, for example 1308/1310 may deflect together and in unison in a direction with a component transverse to the longitudinal axis 101, causing the glass rod or tube to bend. The other gripper pair (e.g., 1308/1310) may stabilize the remaining glass length 103 against deflection.

At 1208, the applied tensile stress fractures the glass rod or tube 100 at the notch 106. The parted glass preform 102 is separated from the remaining glass rod or tube 103, and the preform 102 is moved from the location by known mechanisms, for example a manipulator or a robotic arm.

The remaining glass rod or tube 103 may continue to advance in a continuous process to provide a subsequent preform length 102 and a remaining glass rod or tube 103.

Having thus described the invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A method of forming a glass preform of predetermined length, comprising:
   providing a length of glass material to be separated to form a preform length and a remaining length;
   forming a notch in the glass material;
   inducing a tensile stress in excess of the tensile strength of the glass in an area adjacent to the notch by deflecting a portion of the glass material using an impact tool comprising an impact face that is contoured to correspond with a portion of an outside surface of the glass material; and
   separating the preform length from the remaining length at the notch.

2. The method of claim 1, wherein the length of glass material continually advances in the direction of a longitudinal axis of the glass material as the method is performed.

3. The method of claim 2, wherein the glass material advances in a generally vertically downward direction.

4. The method of claim 2, wherein the impact tool does not advance with the glass material in the direction of the longitudinal axis of the glass material as the method is performed.

5. The method of claim 1, wherein the length of glass material is a solid or hollow cylindrical form.

6. The method of claim 1, wherein the glass material is comprised of two or more glass materials.

7. The method of claim 1, wherein the glass material includes fused silica.

8. The method of claim 1, wherein the notch is formed perpendicular to a longitudinal axis of the length of glass material.

9. The method of claim 1, wherein the deflection is a transverse deflection of the glass material.

10. The method of claim 1, wherein the impact tool comprises a resilient layer.

11. The method of claim 1, wherein the tool is a vibration inducing tool.

12. A method of forming a glass preform of predetermined length, comprising:
   providing a length of glass material to be separated to form a preform length and a remaining length;

forming a notch in the glass material;
inducing a tensile strength in excess of the tensile strength of the glass in an area adjacent the notch by deflecting a portion of the glass material using a set of two or more opposing grippers, each of the two or more opposing grippers having a respective engagement surface that grips the glass material, each respective engagement surface being contoured to correspond with a portion of an outside surface of the glass material, the two or more opposing grippers being displaced with respect to each other perpendicular to a longitudinal axis of the glass material to cause the deflection; and
separating the preform length from the remaining length at the notch.

13. The method of claim 12, wherein the length of glass material continually advances in the direction of the longitudinal axis of the glass material as the method is performed.

14. The method of claim 13, wherein the set of two or more grippers grip and travel with the length of glass material as it continually advances in the direction of the longitudinal axis of the glass material prior to separating the preform length from the remaining length.

* * * * *